Aug. 28, 1956  W. RIEGER  2,760,258
DEVICE FOR QUICKLY CONNECTING AND DISCONNECTING TWO BODIES
Filed June 15, 1951  2 Sheets-Sheet 1

INVENTOR.
WILHELM RIEGER
BY
Hoodling and Krost
attys

Aug. 28, 1956  W. RIEGER  2,760,258
DEVICE FOR QUICKLY CONNECTING AND DISCONNECTING TWO BODIES
Filed June 15, 1951  2 Sheets-Sheet 2

INVENTOR.
WILHELM RIEGER
BY
Shoodling and Krost
attys

United States Patent Office 2,760,258
Patented Aug. 28, 1956

2,760,258

DEVICE FOR QUICKLY CONNECTING AND DISCONNECTING TWO BODIES

Wilhelm Rieger, Munich, Germany, assignor to Richard H. Jordan

Application June 15, 1951, Serial No. 231,835

2 Claims. (Cl. 29—229)

This invention relates to connection means and more particularly to readily connectable means to secure two cylindrical parts together.

An object of the invention is the provision of a device for quickly connecting and disconnecting two cylindrical bodies.

Another object of the invention is the provision for removably inserting and withdrawing a resilient wire into and from two registrable grooves respectively provided in outer and inner surfaces of two cylindrical bodies.

Another object of the invention is the provision for removably inserting and withdrawing a resilient wire into and from two registrable grooves respectively provided in outer and inner surfaces of two cylindrical bodies, plus annular ring guide or tool means to facilitate the insertion or removal of the wire into and from said grooves.

Other objects and a fuller understanding of the invention may be had by referring to the following description and claims, together with the accompanying drawings, in which:

Figure 9:
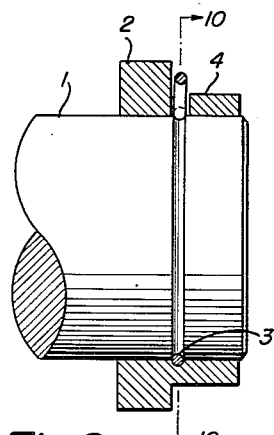
Figure 10:
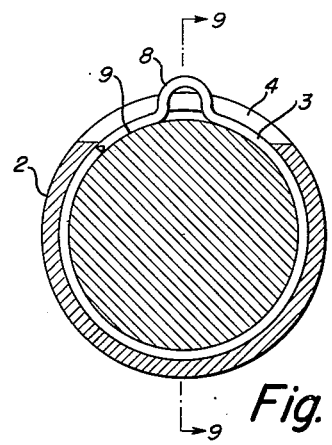
Figure 12:
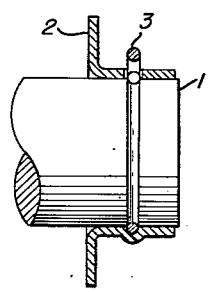
Figure 11:
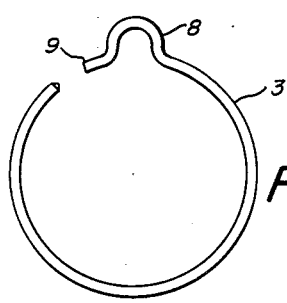

Figures 9 and 10 show further modification of the invention in that the resilient wire is provided with a radially extending loop, the Figure 9 being taken along the line 9—9 of Figure 10 and the Figure 10 being taken along the line 10—10 of Figure 9;

Figure 11 shows a side elevational view of the ring employed in Figures 9 and 10; and Figure 12 shows the employment of the invention to anchor a flange to a shaft.

This invention comprises a novel construction of a member used to connect two cylindrical machine parts, and also a special tool for this purpose. In order to safely connect two cylindrical machine parts, methods have been known whereby annular half-round grooves were turned in the outside of the smaller part and on the inside of the larger part, which when placed together properly would form a complete round groove. By means of a hole through the outside member, a filling matter was then inserted which would fill completely the circular groove and thus make it impossible to separate the two parts.

It has been suggested before to use this method in place of pipe couplings, and it has been suggested to use a steel wire as a filling member of the circular groove. In any of the foregoing methods, however, it was not possible to readily separate the members again, such as is possible with any screw-type connection, and it was for this reason that the aforementioned methods did not become popular.

Figure 3:
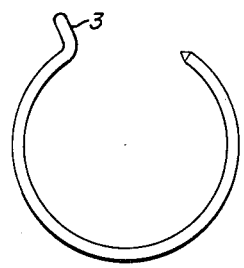
Figure 3 shows a side elevational view of the resilient wire employed to connect the collar and shaft together.

The subject of this invention is a similar connection, inasmuch as the two grooves are used similarly to the two grooves in the foregoing explanation, except that as a filling member a special shaped spring wire of round or square cross-section is used. This wire has been formed to an almost complete ring of approximate diameter of the annular groove into which it is to be inserted. One end of this wire is bent radially outward and the other end has been ground to a point. If one should now try to insert such a ring as shown in Figure 3 into such a groove as explained above, one would have great difficulty, particularly if the diameter of the ring were somewhat larger than the diameter of the groove. Without a special tool this is nearly impossible because to force the ring of spring steel into the smaller diameter of the groove, a change of shape would be necessary and this can be done only by supporting the ring on its outside diameter while feeding it into the groove.

The invention now provides a special tool to do this simply and without any effort. The tool consists of a single or two-part collar, the inside diameter of which is slightly larger than the outside diameter of the steel ring. A simple turning movement will readily force the ring into its groove.

Figure 1:
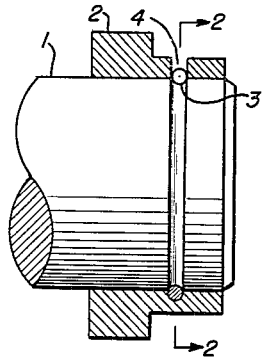
Figure 1 shows a collar surrounding a shaft and incorporating the invention to enable the collar and shaft to be quickly disconnected or connected, the collar being shown in section and taken along the line 1—1 of Figure 2.
Figure 2:
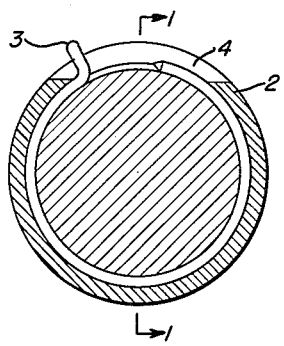
Figure 2 is a cross-sectional view taken along the line 2—2 of Figure 1.

With reference to Figures 1, 2 and 3, Figure 1 shows a collar 2 seated on a shaft 1 and secured to it by a ring 3. Numeral 4 indicates a milled slot or aperture in the collar through which the ring is inserted into the groove. While Figure 1 shows the assembly in an axial cross-section, Figure 2 shows the same assembly in a diametrical cross-section. Figure 3 shows the ring itself.

Figure 4:
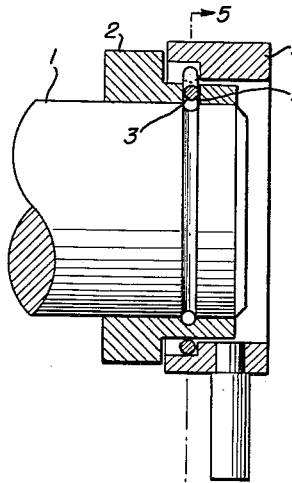
Figure 4 is a view similar to Figure 1 but shows a guide collar or tool surrounding the collar to facilitate the insertion and removal of the resilient wire into and from the grooves, with Figure 4 being taken along the line 4—4 of Figure 5 and with the resilient wire being shown in position preparatory to insertion in the grooves.
Figure 5:
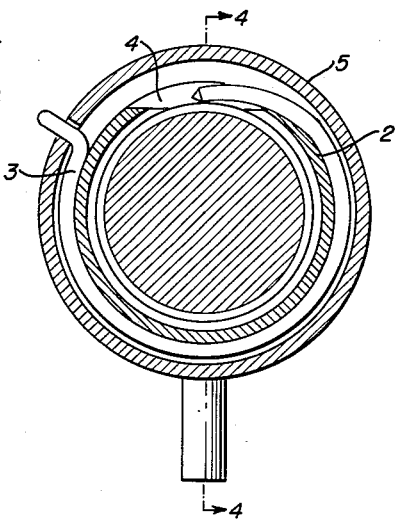
Figure 5 is a cross-sectional view taken along the line 5—5 of Figure 4.

Figures 4 and 5 show the actual process of inserting the ring into the groove, whereby Figure 4 is again an axial cross-section and Figure 5 is a diametrical cross-section.

Numeral 5 denotes the special assembly tool which is necessary to properly insert the ring. As will be seen in Figure 5, the radially outward bent end of ring 3 rests in a slot of the assembly tool 5, while the remainder of the ring 3 is supported throughout its entire length by the recessed step in the tool. The other pointed end, however, is by its shape ready to slip in the groove should the ring be turned in counter-clockwise direction. After the tool has thus been turned approximately one revolution, the ring assumes a position as shown in Figure 2. It becomes obvious that, when engaging the radially bent end of the spring by the special tool, the ring can be "unscrewed" out of the groove, should it become necessary to disengage the collar from the shaft.

Figure 6:
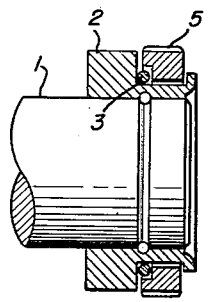
Figure 6 shows an arrangement similar to Figure 4 but with the guide collar or tool permanently mounted on the collar.

Figure 6 shows a permanently combined collar and tool so that with this method a quickly removable collar has been obtained. Turning the special tool 5, which in this case cannot be removed from the collar, will either insert the ring or extricate it.

Figure 7:
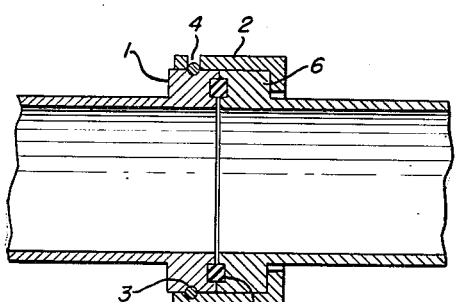
Figure 7 shows the invention as applied to a tube or pipe coupling, the figure comprising a longitudinal, cross-sectional view of the assembly.

Figure 7 shows a pipe coupling with the use of the ring connection. A special collar 6 is necessary to form the outer body and a gasket 7 may be used when tightness against leakage is desired.

Figure 8:
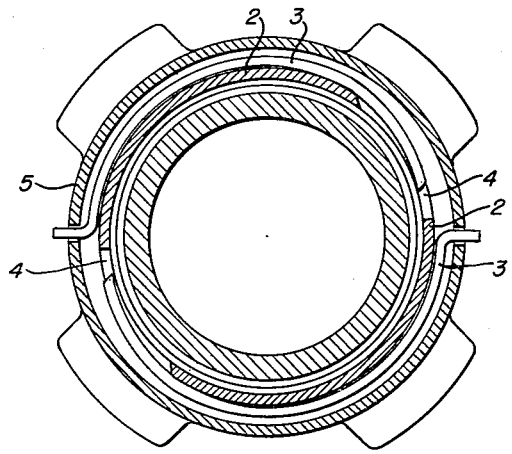
Figure 8 shows the invention with two resilient wires, instead of one as shown in the previous views, whereby it is only necessary to rotate the guide collar or tool less than one-half of a turn to take care of the connection or disconnection.

If the diameters of the parts which are to be connected together become large, the ring can be made out of more than just one part. If two half-rings are used, the turning necessary to assemble the ring is only one-half turn instead of a whole turn. Such assembly is shown in Figure 8. Numeral 3 again shows the ring, of which in this assembly, there are two.

In cases where it should be impossible that the ring become dislodged or even disengaged, as might be possible under severe vibrations or radial stress, the ring may be constructed as shown in Figure 11. Instead of having one end of the ring radially outward bent, it may be bent in the form of a loop and thereafter continue a short distance in the ring form. Figures 9 and 10 show again the application of the ring with a collar, as it was shown in Figures 1 and 2. It is obvious by looking at Figure 10 that once the ring is inserted, any turning of either part in either direction will not cause the ring to get out of position.

Figure 12 shows another use of the ring. In this case, a pressed steel flange is held to the shaft by means of the ring of either of the two constructions. Such shoulder may be used to transmit a considerable axial load. If either the shaft or the load should be rotating, a ring as shown in Figure 11 may be used to assure security.

Although this invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. Tool guide means for use with first and second telescopic annular members, said first annular member having an internal circumferential wall and said second annular member having an external circumferential wall telescopically fitting within said internal circumferential wall, said internal and external circumferential walls having registering circumferential grooves, said first annular member having an external circumferential wall defining in combination with said internal circumferential wall thereof an annular body, said annular body having an aperture therethrough extending from said external circumferential wall to said internal circumferential wall, said tool guide means comprising a turnable collar surrounding the external circumferential wall of said first annular member and turnably movable relative to said external circumferential wall of said first annular member, resilient means having a push-pull portion and a body portion with the body portion insertable into and out of said grooves through said aperture in said annular body, said body portion of said resilient means being normally biased inwardly to enter said aperture in said annular body, and means on said turnable collar for engaging the push-pull portion of said resilient means for pushing and pulling the body portion thereof into and out of said grooves through said aperture upon rotation of said collar relative to said external circumferential wall of said first annular member, said turnable collar having internal circumferentially extending wall means surrounding and radially spaced from said external circumferential wall of the first annular member and defining therewith a circumferentially extending storage space to receive said body portion of the resilient means upon withdrawal of said body portion from said grooves.

2. Tool guide means for use with first and second telescopic annular members, said first annular member having a telescopic circumferential wall and said second annular member having a telescopic circumferential wall telescopically fitting within said telescopic circumferential wall of said first annular member, said telescopic circumferential walls having registering circumferential grooves, one of said annular members having circumferential wall means defining in combination with said telescopic circumferential wall thereof an annular body, said annular body having an aperture therethrough extending from said circumferential wall means to said telescopic circumferential wall thereof, said tool guide means comprising a turnable member disposed adjacent said circumferential wall means of said one of said annular members and turnably movable relative to said circumferential wall means of said one of said annular members, resilient means having a push-pull portion and a body portion with the body portion insertable into and out of said grooves through said aperture in said annular body, and means on said turnable member for engaging the push-pull portion of said resilient means for pushing and pulling the body portion thereof into and out of said grooves through said aperture upon rotation of said turnable member relative to said circumferential wall means of said one of said annular members, said turnable member having circumferential wall means radially spaced from said circumferential wall means of said one of said annular members and defining therewith a circumferentially extending storage space to receive said body portion of the resilient means upon withdrawal of said body portion from said grooves.

References Cited in the file of this patent

UNITED STATES PATENTS

| 1,329,760 | Fulton | Feb. 3, 1920 |
|---|---|---|
| 1,395,946 | Clemons | Nov. 1, 1921 |
| 1,464,386 | Ingram | Aug. 7, 1923 |
| 1,790,218 | Appleby | Jan. 27, 1931 |
| 2,386,834 | Barnum et al. | Oct. 16, 1945 |
| 2,403,368 | Howard | July 2, 1946 |
| 2,496,591 | Maxwell | Feb. 7, 1950 |
| 2,513,792 | Forster | July 4, 1950 |

FOREIGN PATENTS

| 497,940 | Germany | May 15, 1930 |
|---|---|---|
| 516,865 | Germany | Jan. 28, 1931 |
| 553,271 | Great Britain | May 14, 1943 |